United States Patent
Choi

(10) Patent No.: US 7,250,979 B2
(45) Date of Patent: Jul. 31, 2007

(54) FORMAT CONVERTING APPARATUS AND METHOD

(75) Inventor: Seung Jong Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 614 days.

(21) Appl. No.: 10/640,671

(22) Filed: Aug. 14, 2003

(65) Prior Publication Data
US 2004/0218094 A1 Nov. 4, 2004

(30) Foreign Application Priority Data
Aug. 14, 2002 (KR) .................. 10-2002-0048143

(51) Int. Cl.
H04N 5/46 (2006.01)
H04N 11/20 (2006.01)

(52) U.S. Cl. .................. 348/441; 348/443; 348/558

(58) Field of Classification Search ............. 348/441, 348/443, 450, 454, 455, 459, 554, 556–558
See application file for complete search history.

(56) References Cited

U.S. PATENT DOCUMENTS

| | | | | |
|---|---|---|---|---|
| 5,754,248 A | * | 5/1998 | Faroudja | 348/474 |
| 5,796,442 A | * | 8/1998 | Gove et al. | 348/556 |
| 5,999,220 A | * | 12/1999 | Washino | 348/441 |
| 6,157,396 A | * | 12/2000 | Margulis et al. | 345/506 |
| 6,421,094 B1 | * | 7/2002 | Han | 348/569 |
| 6,791,620 B1 | * | 9/2004 | Elswick et al. | 348/441 |

\* cited by examiner

Primary Examiner—Trang U. Tran
(74) Attorney, Agent, or Firm—Birch, Stewart, Kolasch & Birch, LLP

(57) ABSTRACT

A format converting apparatus and method for performing a resolution conversion, frame rate conversion, scanning method conversion, aspect ratio conversion, chroma format conversion, color space conversion, gamma correction, and geometric correction in one chip are disclosed. A digital TV can process various video signal standards such as the digital TV signal, the analog TV signal, the computer video signal, and the component signal as well as other video signals of more wide range in a same block. More especially, since all format conversion is performed in one chip, new additional input signal does not make addition of the hardware so that the cost can be reduced.

12 Claims, 9 Drawing Sheets

Original Image

Pincushion

Keystone

Tilt

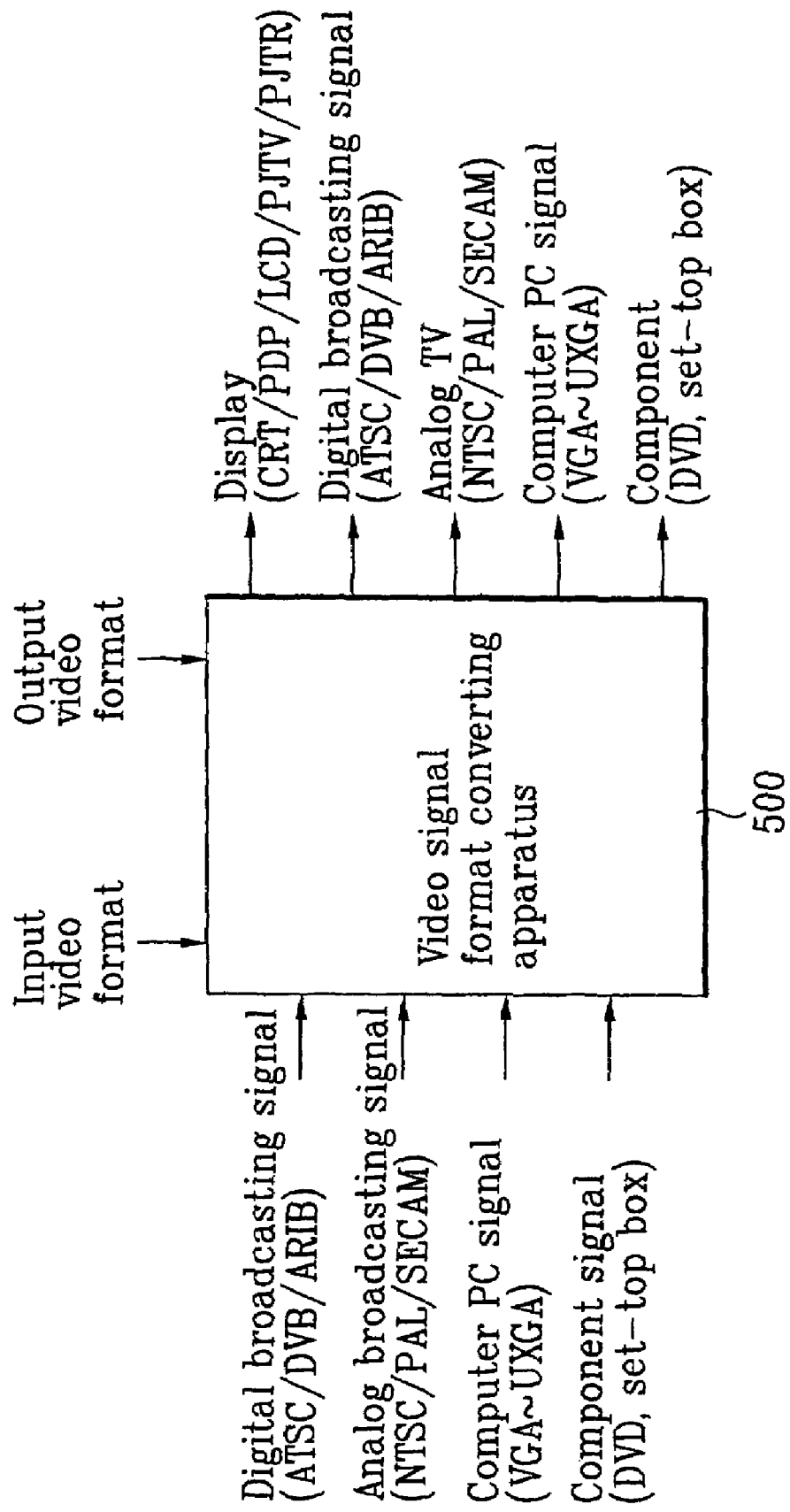

FORMAT CONVERTING APPARATUS AND METHOD

This application claims the benefit of the Korean Application No. P 2002-48143 filed on Aug. 14, 2002, which is hereby incorporated by reference.

BACKGROUND OF THE INVENTION

1. Field of the Invention

The present invention relates to a digital television receiver (TV), and more particularly, to an apparatus and method for converting formats of input video signals of diverse types into formats of output video signals of diverse types through a single integrated block.

2. Discussion of the Related Art

Generally, there are a great variety of standard for a video signal and a display for displaying the same. Namely, there are standard of the video signal such as a conventional analog TV signal (for example, NTSC/PAL/SECAM), a VCR signal, a computer PC signal (for example, VGA to UXGA) as well as a recent digital TV signal (for example, ATSC/DVB/ARIB) according to a system to be applied.

Moreover, there are various displays for displaying the video signal such as a conventional cathode ray tube (CRT) and a projection, which are widely used as well as a plasma display panel, and a liquid crystal display, which are developed in recent, and a computer etc.

More especially, the development and popularization of the digital TV gradually increase the need to correspond to the various video standard and displays, and the semiconductor process technology has been developed so that various functions show a tendency to be integrated into one chip.

Contrary to the analog TV, the digital TV supports a multi-format. For example, the ATSC standard of the United States digital TV broadcasting standard defines 18 broadcasting formats. Here, the format means following four, namely a space resolution, a frame rate, scanning method, and an aspect ratio.

1. Space resolution: 720×480, 1280×720, 1920×1080, etc.
2. Frame rate: 24, 30, 59.94, 60, 80 Hz, etc.
3. Scan: Interlaced scan, Progressive scan
4. Aspect ratio: 4:3, 16:9, 14:9, etc.

Namely, the digital TV can receive videos having various sizes such as a high definition (HD) video, a standard definition (SD) video, a computer video signal, and an analog signal, so that can process the various videos. As described above, a various output format is required according to the various type displays.

Accordingly, there is a demand for an apparatus for converting respective input format into desired output format.

According to the conventional art, a format conversion is defined for the space resolution, the frame rate, and the scan method. A recent method is proposed to adding the aspect ratio.

Therefore, a format converting apparatus of the digital TV converts inputted signal with various formats, for example, the space resolution of the inputted video, the frame rate, the scanning method, and the aspect ratio into desired output formats.

FIG. 1 illustrates a block diagram of a format converting apparatus of a conventional digital TV.

Namely, it is assumed that an RF type DTV signal is modulated in a way of vestigial sideband (VSB). An VSB demodulating unit 101 demodulates the RF type DTV signal and outputs the demodulated signal to a transport (TS) demultiplexer 102 in a transport stream type. The TS demultiplexer 102 selects a desired single program from a plurality of programs contained in one channel, separates an audio and video bitstreams multiplexed in the selected program, and outputs the separated video bitstream to a video decoder 103 and separated audio bitstream to an audio decoder 105.

The video decoder 103 eliminates an overhead (various header information, a start code, etc.) from the input video bitstream, makes a pure data information undergo a variable length decoding (VLD), and restores the pure data information into an original screen's pixel value through an inverse quantizing procedure, an inverse discrete cosine transform (IDCT) procedure, and a motion compensating procedure using a motion vector, so that outputs the deocoded picture to a format converting unit 104. The audio decoder 105 decodes the audio bitstream encoded by using an MPEG algorithm or an Dolby (AC)-3 algorithm and outputs the decoded audio PCM data through a speaker.

The format converting unit 104 extracts four format information, that is, the resolution, the frame rate, the scan method, and the aspect ratio contained in the digital broadcasting signal transmitted from a broadcasting station, and performs the conversion of the input video to the output video format (for example, 1920×1080 30i 16:9, i indicates the interlaced scan) suitable to the display by using the extracted format information.

However, the format converting apparatus for a DTV illustrated in FIG. 1 can perform the format conversion for the digital broadcasting signal, but had problems to support the format conversion of other video signals (for example, an analog TV signal, a computer video signal, and a component signal, etc.).

In other words, since there is prepared the format converting unit for processing the digital TV signal but a format converting unit for processing other video signal, there is a need for further format converting unit as illustrated in FIG. 2.

FIG. 2 illustrates a block diagram showing an example of a format converting apparatus for converting format the other video signal except for the conventional digital TV signal, and has a disadvantage that a format converting unit 205 for format-converting the analog TV signal, the computer video signal, and the component signal should be added in the apparatus illustrated in FIG. 1. At that time, the format-converted video signal by a DTV format converting unit 204 or the added format converting unit 205 is selectively outputted through a multiplexer 206.

At that time, the analog TV signal, the component signal, and the computer video signal[1] are produced according to the standards such as CCIR Recommendations 601 format (D1), EIA770.1~EIA770.3, and VESA, and do not contain the format information. Therefore, the format converting unit 205 performs the format-conversion by detecting the format of video from the inputted signals or being noticed by a user.

Consequently, the added format converting unit 205 illustrated in FIG. 2, has a construction as illustrated in FIG. 3 for overcoming the disadvantages as described above.

FIG. 3 illustrates a detail block diagram of the format converting unit in FIG. 2.

For example, if an NTSC composite video signal is inputted, an NTSC decoder 301 separates a horizontal/vertical synchronized signal, a brightness signal Y, and a color signal C. If necessary, a color converting unit 302 performs a color space conversion (for example, YIQ→YCbCr) and inputs the converted signals into a format converting unit 306. The format converting unit 306 should support the chroma format 4:4:4 or 4:2:2 in addition to 4:2:0 (digital broadcasting video).

Moreover, the computer video signal, VGA~UXGA, etc., is inputted through an RGB input unit 303 in the form of an RGB, and if necessary, is inputted into the format converting unit 306 after the color space conversion (for example, RGB→YCbCr) are performed. The component signal, 480*i* through 1080*i* is directly inputted into the format converting unit 306 through the input unit 305.

As described above, according to the conventional art, in order to process an additional video signal such as the analog TV signal, the computer video signal, and the component signal, the respective color space conversion should be independently performed and the format converting unit should support the chroma format conversion as illustrated in FIG, 3.

This system has a disadvantage that a corresponding block should be continuously added from exterior of the format converting unit 204 of the digital TV whenever the video input signal is added.

Moreover, in order to connect the format-converted signal with the various displays, a gamma correction, and a geometric correction should be performed by considering a specific characteristic of the display, but there is occurred a problem to add the above added circuit whenever the display is changed. Here, the gamma correction means the correction for various distortions[2] occurring from the color characteristic of the display. The gamma correction is applied to all display. Moreover, the geometric correction means the correction for various geometric distortion[3] occurring from the display characteristic as illustrated in FIGS. 4A through 4D. More particularly, in the CRT and the projection type, the problem is very serious, but in the PDP and LCD, the same problem does not occur.

As described above, the conventional format-conversion method has a disadvantage that new hardware should be added into the format converting unit so as for the corresponding conversion whenever an external video signal is added. When the tendency for integrating a plurality of media into the digital TV in the future more and more, it can be forecasted for more various video signals to be inputted so that the external converting unit is gradually increased and the hardware can be bigger and bigger.

SUMMARY OF THE INVENTION

Accordingly, the present invention is directed to a format converting apparatus and method that substantially obviates one or more problems due to limitations and disadvantages of the related art.

An object of the present invention is to provide a format converting apparatus and method for processing a color space and gamma correction, a chroma format conversion, and a geometric distortion correction in a format converting unit.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a format converting apparatus processes a space resolution, a frame rate, a scanning method, and an aspect ratio as well as a color space conversion, a chroma format conversion, a gamma correction, and a geometric distortion correction in a single format converting unit. It can be understood that the conventional format conversion is expanded more and more. With this fact, the digital TV can process more various video signals and enhance the performance of the format conversion.

To achieve these objects and other advantages and in accordance with the purpose of the invention, as embodied and broadly described herein, a format converting apparatus includes an input/output video format detecting unit for taking an input video format when format information of an input video signal is transmitted, detecting the input video format by using a synchronized signal of the input video or extracting the format information noticed from an outside by a user when the format information is not transmitted, and detecting a format of an output video set in a system according to an output video desired by the user or a characteristic of an output device, a format converting unit for converting a space resolution, a frame rate, a scanning method, an aspect ratio, a chroma format and a color space inputted according to the format information of the input/output videos detected by the input/output video format detecting unit into the format of the detected output video, and a format converting and display characteristic correcting unit for performing a gamma correction and a geometric correction of the format converted video signal according to the characteristic of the output device, wherein the input/output video format detecting unit, the format converting unit and the display characteristic correcting unit are integrated into a single chip.

In another aspect of the present invention, a format converting apparatus includes a memory for storing inputted video signal, a video decoding unit for reading compressed video bitstream from the memory when the video signal stored in the memory is compressed, decoding the video bitstream, and storing the decoded video signal into the memory again, a video signal format detecting unit for detecting a format of the input video signal from the input video signal or format information stored by a user, a controlling unit for detecting the format information of the output video suitable to a display and the format of the input video detected in the video signal format detecting unit and outputting the detected output video format and the detected input video format, a format converting unit for reading the input video or the decoded video stored in the memory according to the input video format information and the output video format information outputted from the controlling unit, and converting and storing the space resolution, the frame rate, the scanning method, the aspect ratio, the chroma format and the color space conversion in the memory again, and a display characteristic correcting unit for reading the video stored in the memory according to the input video format and the output video format information outputted from the controlling unit, performing a gamma correction and a geometric correction, and outputting the corrected video to the display.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 illustrates a conceptional view of a format converting apparatus according to the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

FIG. 5 illustrates a conceptional view of a format converting apparatus according to the present invention.

A format converting apparatus according to the present invention converts input signals of various standards, for example, digital broadcasting signals ATSC/DVB/ARIB, analog broadcasting signals VTSC/PAL/SECAM, computer PC signals VGA~UXGA, and component signals a DVD and a set-top box into an output signal of a desired format, for example, display driving signals CRT/PDP/LCD/PJTV/PJTR, digital broadcasting signals ATSC/DVB/ARIB, analog TV signals NTSC/PAL/SECAM, computer PC signals VGA~UXGA, and component signals a DVD and a set-top box through a video signal format converting apparatus 500 constructed with single chip without separate circuit.

Namely, the video signal format converting apparatus 500 according to the present invention performs the following format conversion by integrating functions such as a color space conversion, a chroma format conversion, a gamma correction, and a geometric correction to the conventional space resolution, the frame rate, the scanning method, the aspect ratio conversion.

Figure 1:
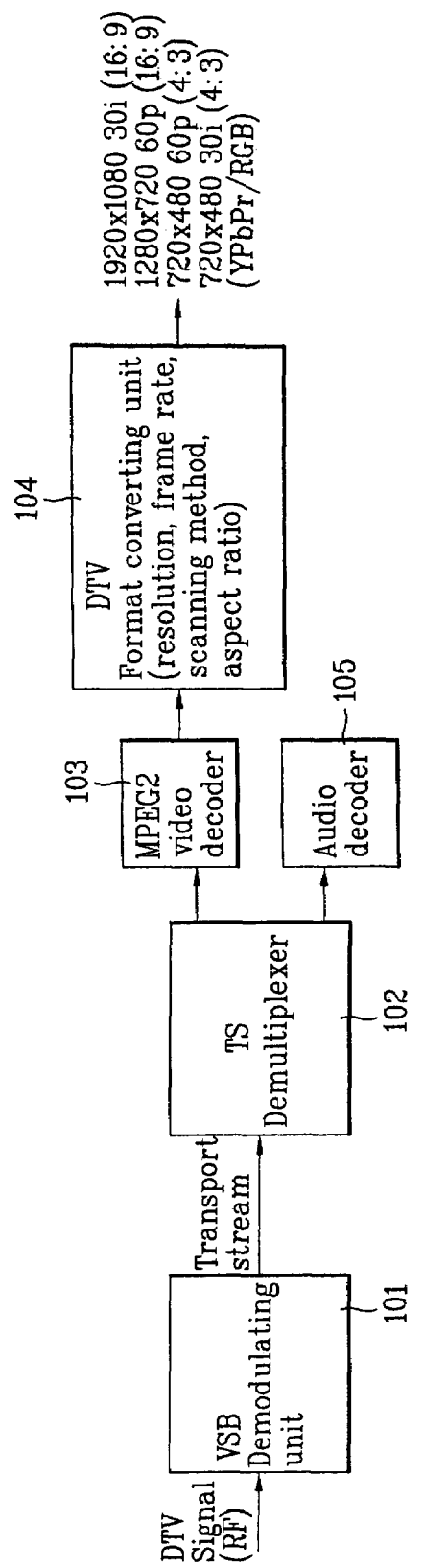
FIG. 1 illustrates a block diagram of a conventional digital TV.
Figure 2:
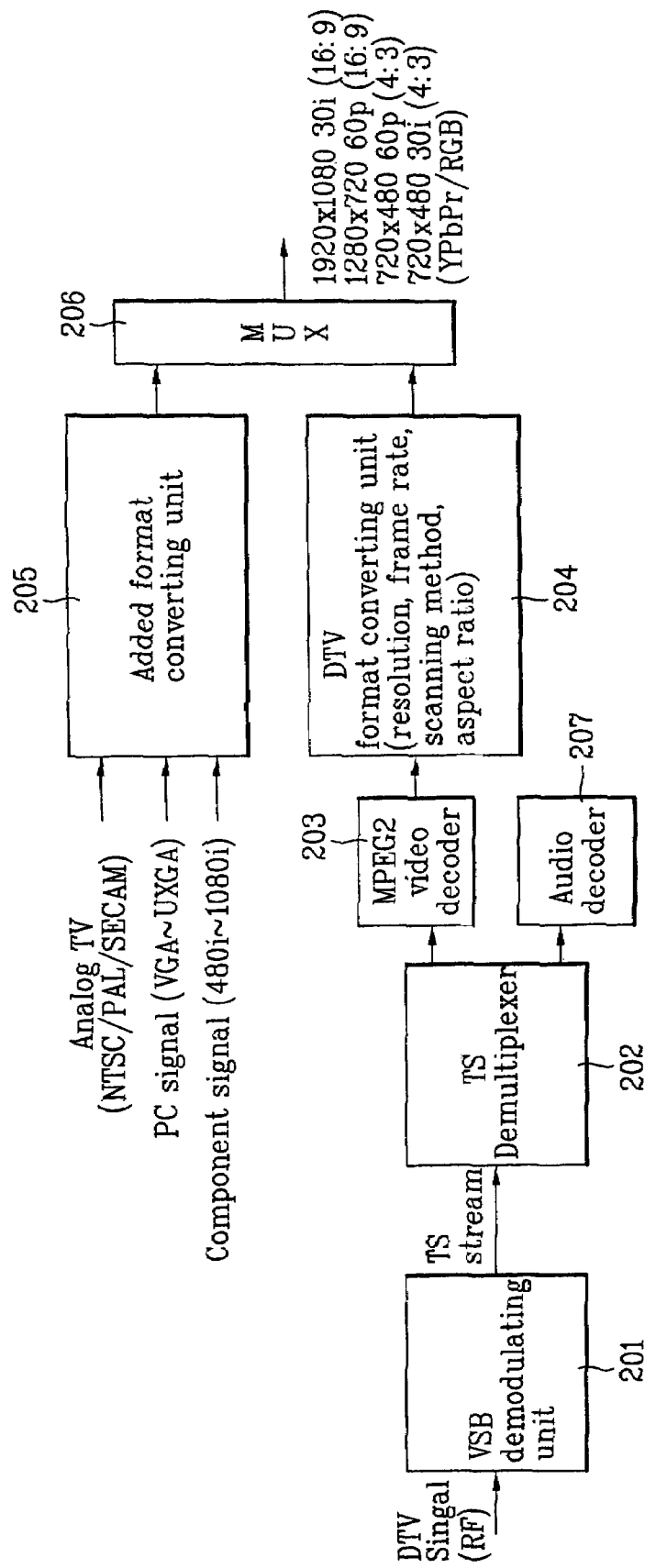
FIG. 2 illustrates a block diagram of a conventional digital TV for format-converting other video signal except for the conventional digital TV signal.
Figure 3:
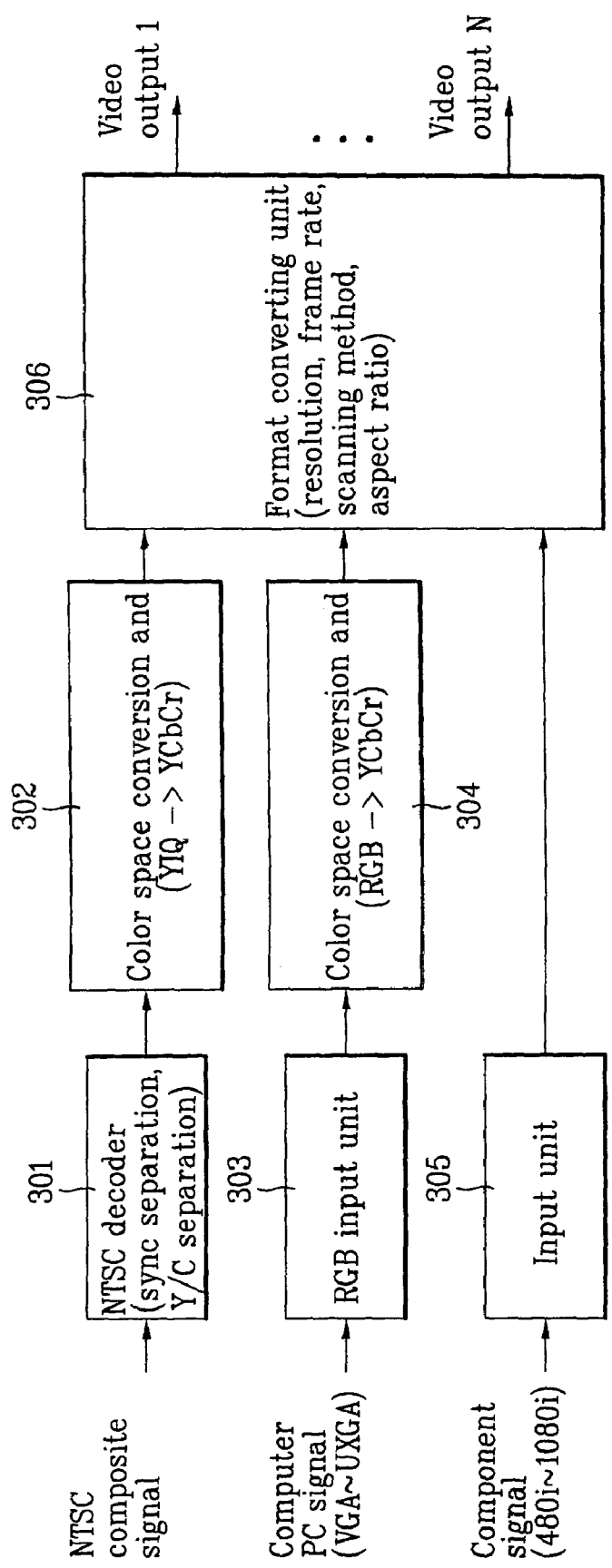
FIG. 3 illustrates a detail block diagram of an example of the format converting unit in FIG. 2.
Figure 4A:
FIGS. 4A through 4D illustrate examples of a geometric distortion
Figure 4B:
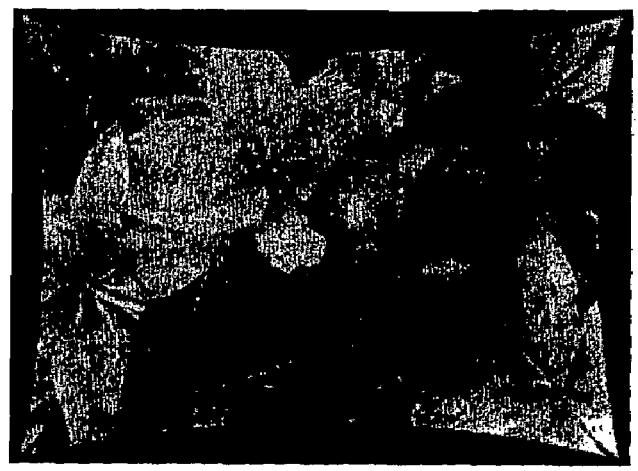
Figure 4C:
Figure 4D:
Figure 6:
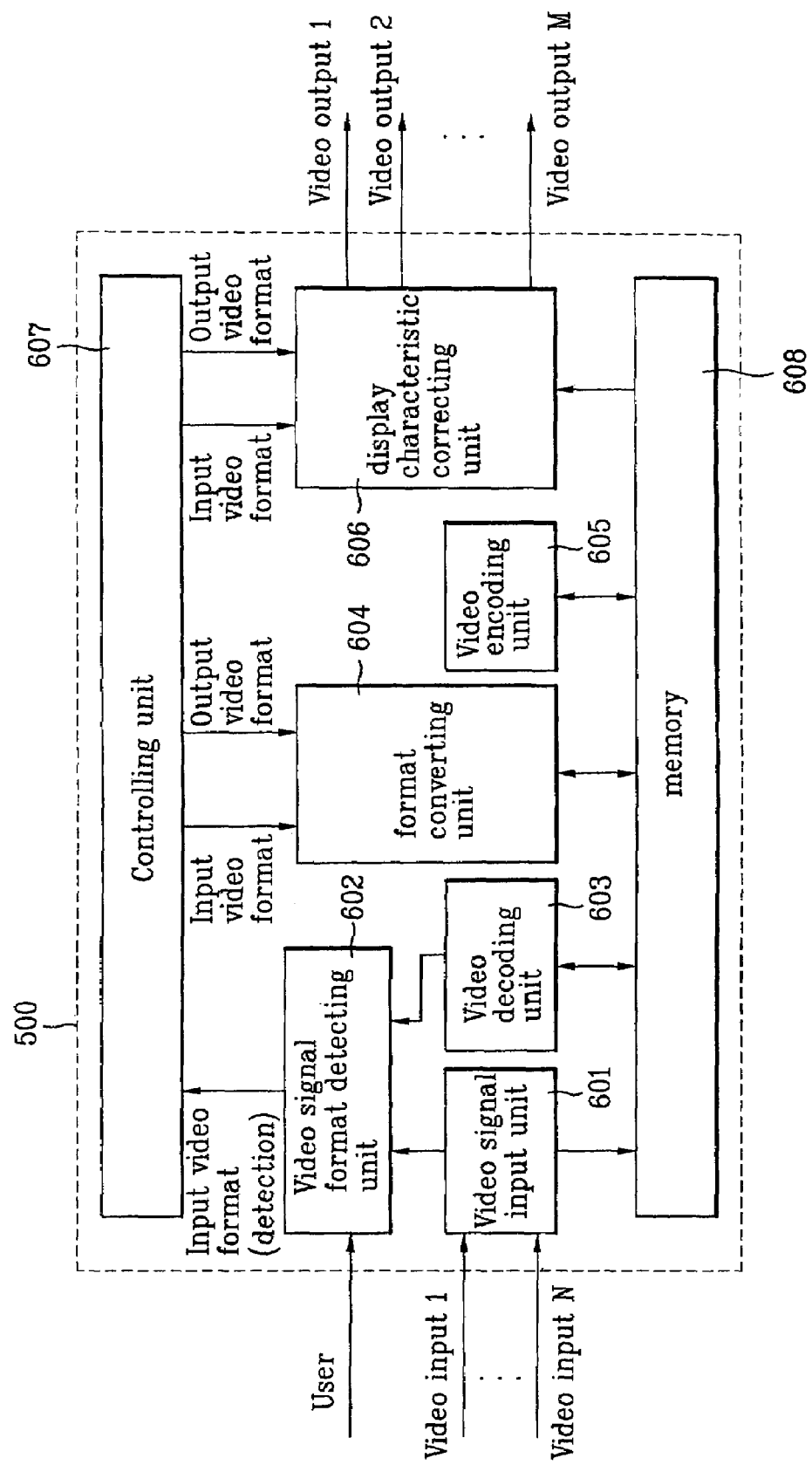
FIG. 6 illustrates a detail block diagram of the format converting apparatus of the present invention.

1. Space resolution: 640×480, 720×480, 1280×720, 1920×1080, etc.
2. Frame rate (unit: Hz): 24, 30, 59.94, 60, 80, 100 etc.
3. Scanning method: Interlaced scan, Progressive scan
4. Aspect ratio: 4:3, 14:9, 16:9, 20:9, etc.
5. Chroma format: 4:2:0, 4:1:1. 4:2:2, 4:4:4, etc.
6. Color space: RGB, YCbCr, YUV, YIQ, etc.
7. Gamma correction
8. Geometric correction FIG. 6 illustrates a detail block diagram of the format converting apparatus in FIG. 5.

Namely, the format converting apparatus according to the present invention, includes a video signal input unit 601 for storing inputted video signals of a variety of standards into a memory 608 and outputting the inputted signals of a variety of standards to a video signal format detecting unit to be described as follows so as to detect a format of an input video, the video decoding unit 603 for reading compressed video bitstream from the memory 608 when the input video signal is compressed, decoding the video bitstream, storing the decoded video signal into the memory 608 again, and outputting the decoded video signal to a video signal format detecting unit being described as follows so as to detect the input video format, the video signal format detecting unit 602 for detecting a format of the input video signal from the video signal inputted through the video signal input unit 601 and the video decoding unit 603 or a format information indicated by a user, a controlling unit 607 for detecting an output video format information suitable to a present display and outputting the detected output video format information and a format information of the input video, a format converting unit 604 for reading the input video or the decoded video from the memory 608 according to the input video format information and the output video format information outputted from the controlling unit 607, and converting and storing the space resolution, the frame rate, the scanning method, the aspect ratio, the chroma format, and the color space in the memory 608 again, a video encoding unit 605 for reading and compressing the format-converted video signal from the memory 608 and storing the compressed video bitstream into the memory 608 again when a desired output video is compressed, and a display characteristic correcting unit 606 for reading the video stored in the memory 608 according to the input video format information and the output video format information outputted from the controlling unit 607, performing a gamma correction and a geometric correction, and outputting the corrected video to the display.

The inputs of the format converting apparatus of the present invention as described above are video signals of a variety of standards, for example, digital broadcasting signals, for example, ATSC/DVB/ARIB, analog TV signals, for example, NTSC/PAL/SECAM, computer video signals, for example, VGA~UXGA, and component signals, for example, a DVD and a set-top box, etc. Meanwhile, the output of the format converting apparatus of the present invention are also video signals of a variety of standards, for example, display driving signals, for example, CRT/PDP/LCD/PJTV/PJTR, digital broadcasting signals, for example, ATSC/DVB/ARIB, analog TV signals, for example, NTSC/PAL/SECAM. Computer video signals, for example, VGA~UXGA, and component signals, for example, a DVD and a set-top box, etc. In other words, the inputted video signal is single or a plurality, and the video signal outputted after being format-converted can be single or a plurality.

For this purpose, if any one from the video signals of a variety of standards is inputted, the video signal input unit 601 stores any one from the video signals of a variety of standards in the memory 608 through an interface and outputs the one to the video signal format detecting unit 602 for the purpose of detecting the format.

Moreover, when the input video signal is compressed, for example, the input signal is the digital broadcasting signal, the video decoding unit 603 reads and decodes the input video bitstream from the memory 608, stores the decoded video signal in the memory 608 and outputs the decoded input video signal to the video signal format detecting unit 602 in order to detect the format. Namely, the video decoding unit 603 decodes the inputted signal when the inputted signal is a compressed digital bitstream. The video decoding unit 603 employs an MPEP2 MP@HL decoder.

The video signal format detecting unit 602 detects a format information of the input video signal from the video signal outputted from the video signal input unit 601 or the video decoding unit 603 or an input video format indicated by a user and outputs the detected format information to the controlling unit 607.

The controlling unit 607 detects the format information of the output video to be displayed on the present display. Namely, the format of the output video can be indicated by the user or set by a system according to the information of the display connected thereto, and the controlling unit 607 detects these formats of the output video. Moreover, the detected format information of the output video is outputted to the format converting unit 604 and the display characteristic correcting unit 606 together the format information of the input video.

Figure 7:
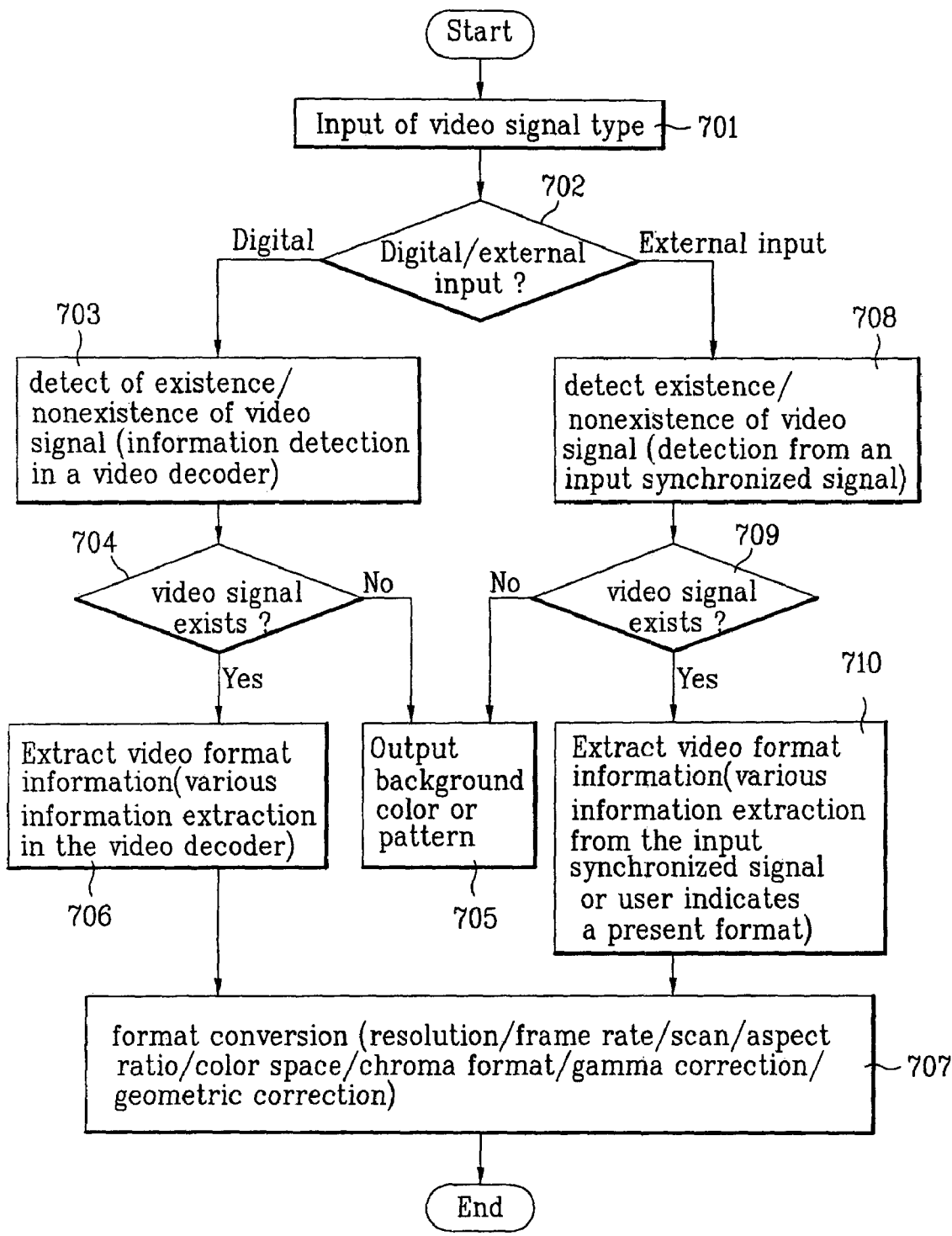
FIG. 7 illustrates an operational flow chart of the format converting apparatus of the present invention.

FIG. 7 illustrates an operational flow chart of the video signal format detecting unit 602, the format converting unit 604, and the display characteristic correcting unit 606 of the present invention.

First, the input video format information is taken when the format information of the input video signal is transmitted, and the input video format is detected by using a synchronized signal of the input video or format information noticed from an external by a user when the format information is not transmitted.

Namely, if the video signal were inputted (Step 701), it is determined whether the inputted video signal is a digital signal (for example, the compressed video bitstream) or an external input (for example, a computer video signal) (Step 702).

If the digital broadcasting signal is determined, it is detected whether the video signal is or not (Step 703). If the video signal is not (Step 704), a background color or a predetermined pattern is outputted (Step 705). If the video signal is, the video format information is extracted from the input video signal (Step 706). For example, the existence and nonexistence of the video signal and the video format information can be known from the video signal decoded in the video decoding unit 603.

Meanwhile, since the format information is not transmitted if it is determined as external input, the existence and nonexistence of the video signal is detected from an input synchronized signal (Step 708). If nonexistence of the video signal is determined (Step 709), the background color or the predetermined pattern is outputted (Step 705), and if the existence of the video signal is determined, the format information of the input video is extracted by the inputted synchronized signal or the input format indicated by the user (Step 710). Namely, since there is not format information in a case of the external input, the format information of the input video is extracted by using the synchronized signal or the indication by the user.

As described above, when the format information of the input video is detected, the controlling unit 607 outputs the format information of the output video and the format information of the input video to the format converting unit 604 and the display characteristic correcting unit 606.

The format converting unit 604 reads the video stored in the memory 608 in order to adjust the format of the input video received from the controlling unit 607 to the format of the output video, and converts and stores the space resolution, the frame rate, the scanning method, the aspect ration, the chroma format and the color space in the memory 608 again. Meanwhile, the display characteristic correcting unit 606 reads the format-converted video stored in the memory 608, and performs and outputs the gamma correction, and the geometric correction to the display (Step 707). Here, since the gamma correction makes the value of the brightness Y, the gamma correction can be considered one of format conversion. The gamma correction is required when the display is a TV, but is not required to a personal computer.

Figure 8:
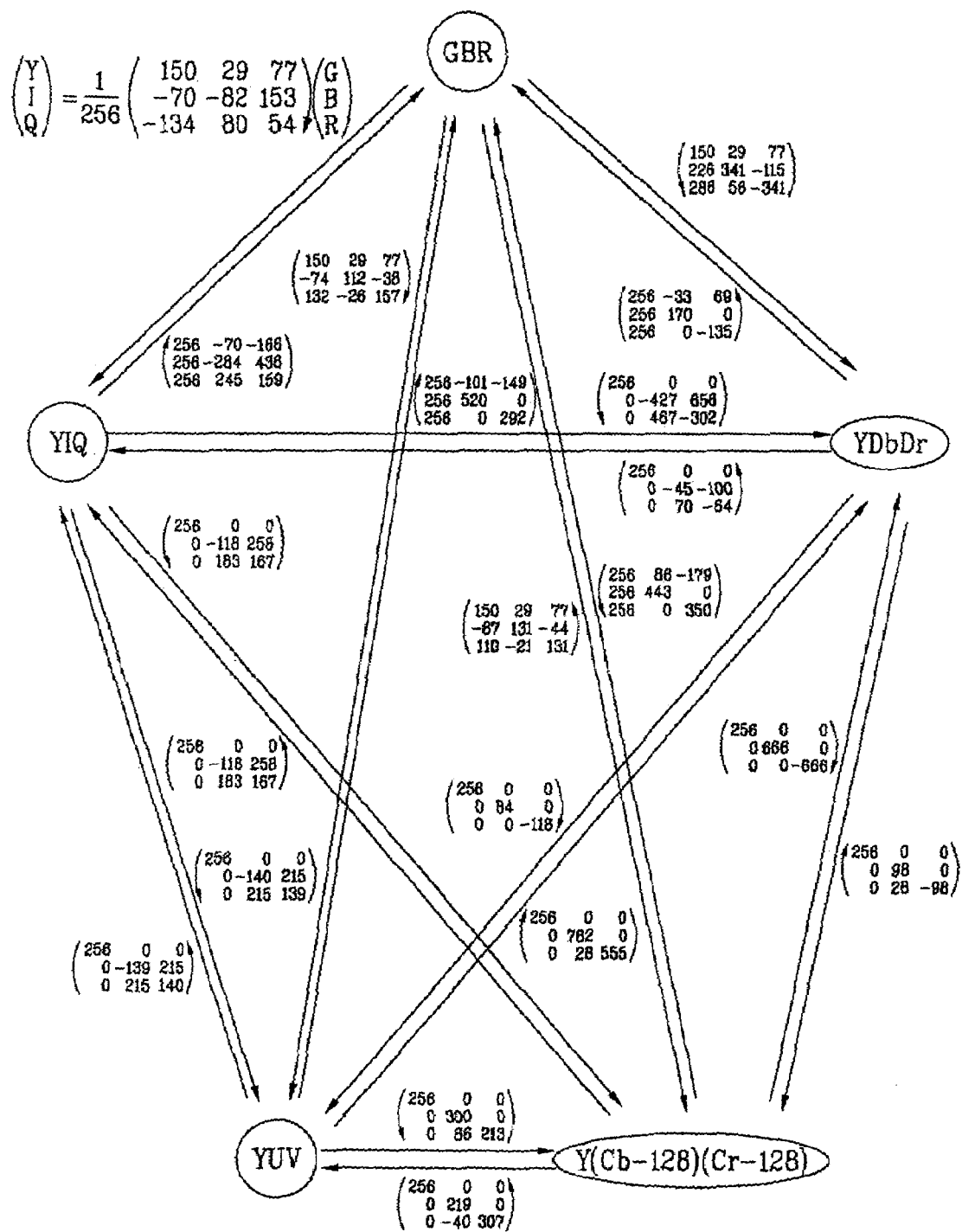
FIG. 8 illustrates an explaining view showing an example of a color space conversion according to the present invention.

FIG. 8 illustrates an example of the conversion between color spaces according to the present invention.

As illustrated in FIG. 8, when the color space of the input video is YCbCr and the color space of a desired output video is RGB, the conversion can be expressed as the following equation 1.

$$\begin{bmatrix} R \\ G \\ B \end{bmatrix} = \begin{bmatrix} 256 & -86 & -179 \\ 256 & 443 & 0 \\ 256 & 0 & 350 \end{bmatrix} \begin{bmatrix} Y \\ Cb - 128 \\ Cr - 128 \end{bmatrix} \quad \text{[Equation 1]}$$

$$R = 256 \times Y - 86(Cb - 128) - 179(Cr - 128)$$

$$G = 256 \times Y + 443(Cb - 128)$$

$$B = 256 \times Y + 350(Cr - 128)$$

Moreover, if the output video format desired by the user is the compressed bitstream, the video encoding unit 605 reads and compresses the format-converted video signal from the memory 608 and stores the compressed video bitstream in the memory 608 again.

As described above, the format converting unit 604 performs the space resolution, the frame rate, the scanning method, the aspect ratio, the chroma format conversion, and the color space conversion according to the format of the output video, and the display characteristic correcting unit 606 performs various correction such as the gamma correction and the geometric correction for the format-converted video signal based on the display.

For example, if it is assumed that the input signal is the computer video signal, the color space is RGB type and the chroma format is 4:4:4. To display these on the digital TV, the format converting unit 604 converts and outputs the resolution, the frame rate, the scanning method, and the aspect ratio as well as the color space into YCbCr type. And the format converting unit 604 should support the chroma format 4:4:4. If necessary, the gamma correction is performed.

As described above, the present invention supports conversion between various video standards.

As mentioned above, according to the format converting apparatus of the present invention, the resolution conversion, the frame rate conversion, the scanning method conversion, the aspect ratio conversion, the chroma format conversion, the color space conversion, the gamma correction, and the geometric correction are performed in one integrated format converting apparatus, so that a digital TV can support various video signal standards such as the digital TV signal, the analog TV signal, the computer video signal, and the component signal as well as other video signals of more wide range in a same block. In addition, since this consequence is converted into other video standard, video signal outputs of various standards can be supported. Further, by correcting the characteristic of the display, various displays can be supported.

More specially, since all format conversion is performed in one chip, new external input signal does not make addition of the hardware so that the cost can be reduced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A format converting apparatus, comprising:
    a video format detecting unit for detecting an input video format of an input video signal using format information included in the input video signal or format information input by a user;
    a controlling unit for detecting an output video format of an output video set using a characteristic of the output video set or information from the user;
    a format converting unit for converting a space resolution, a frame rate, a scanning method, an aspect ratio, a chroma format, and a color space conversion of the input video format to the output video format; and
    a display characteristic correcting unit for correcting a gamma correction and a geometric correction of the format converted video signal according to the input video format and the output video format,
    wherein the video format detecting unit is directly connected to the controlling unit and sends the detected input video format to the controlling unit, and the controlling unit is directly connected to the format converting unit and the display characteristic correcting unit and sends the detected input and output video formats to the format converting unit and the display characteristic correcting unit such that the video format detecting unit, the controlling unit, the format converting unit and the display characteristic correcting unit are integrated into a single chip.

2. The format converting apparatus as claimed in claim 1, further comprising a video decoder for decoding a video bitstream of the input video signal when the input video signal is compressed.

3. The format converting apparatus as claimed in claim 1, further comprising a video encoder for compressing the format-converted video signal when the output video format is to be compressed.

4. A format converting apparatus, comprising:
    a memory for storing an input video signal;
    a video decoding unit for reading a compressed video bitstream of the input video signal from the memory when the input video signal stored in the memory is compressed, decoding the video bitstream, and storing the decoded video signal into the memory again;
    a video signal format detecting unit for detecting an input video format of the input video signal using format information included in the input video signal or format information input by a user;
    a controlling unit for detecting an output video format suitable to a display using a characteristic of the display or information input by the user;
    a format converting unit for reading the input video signal or the decoded video signal stored in the memory converting a space resolution, a frame rate, a scanning method, an aspect ratio, a chroma format, and a color space of the read input video signal to the output video format and storing the converted video signal in the memory again; and
    a display characteristic correcting unit for reading the format converted input video signal stored in the memory, performing a gamma correction and a geometric correction according to the input video format and the output video format, and outputting the corrected video signal to the displays,
    wherein the video decoding unit is directly connected to the memory, the video signal format detecting unit is directly connected to the controlling unit and sends the detected input video format to the controlling unit, the controlling unit is directly connected to the format converting unit and the display characteristic correcting unit and sends the detected input and output video formats to the format converting unit the display characteristic correcting unit.

5. The format converting apparatus as claimed in claim 4, wherein the memory, the video decoding unit, the video signal format detecting unit, the controlling unit, the format converting unit, and the display characteristic correcting unit are constructed into one chip.

6. The format converting apparatus as claimed in claim 4, further comprising a video signal input unit for receiving video signals of various standards and outputting the received video signals to the video signal format detecting unit.

7. The format converting apparatus as claimed in claim 4, further comprising a video encoding unit for reading and compressing the format-converted video signal stored in the memory when a desired output video signal is compressed, and storing the compressed video bitstream in the memory again.

8. The format converting apparatus as claimed in claim 4, wherein the video decoding unit comprises an MPEG MP@HL decoder.

9. A format converting method, comprising:
    storing input video signals with various standards;
    detecting an input video format using a synchronized signal of an input video signal or format information input by a user;
    detecting an output video format of a display;
    converting a resolution, a frame rate, a scanning method, an aspect ratio, a chroma format, and a color space of the input video format to the output video format; and
    performing a gamma correction and a geometric correction of the format-converted video signal and outputting the corrected video signal to the display,
    wherein the detected input and output video formats are directly sent to the converting step and the converting step stores the format converted video signal in a memory, and
    wherein the detected input and output video formats are directly sent to the correcting step and the correcting step corrects the format-converted video signal using the format converted video signal stored in the memory and the detected input and output video formats.

10. The format converting method as claimed in claim 9, wherein when the color space of the input video signal is YCbCr and the color space of a desired output video signal is RGB, the conversion is performed using the following equation:

$$\begin{bmatrix} R \\ G \\ B \end{bmatrix} = \begin{bmatrix} 256 & -86 & -179 \\ 256 & 443 & 0 \\ 256 & 0 & 350 \end{bmatrix} \begin{bmatrix} Y \\ Cb - 128 \\ Cr - 128 \end{bmatrix}$$

$R = 256 \times Y - 86(Cb - 128) - 179(Cr - 128)$ $G = 256 \times Y + 443(Cb - 128)$ $B = 256 \times Y + 350(Cr - 128).$

11. The format converting method as claimed in claim 9, further comprising compressing and outputting the format-converted video signal when a desired output video format is a compressed bitstream.

12. The format converting method as claimed in claim 9, wherein if the input video signal is a computer video signal having the color space of an RGB type and the chroma format is 4:4:4, and the display is a digital TV, the color space is converted into a YCbCr type, and the format converting step supports the chroma format 4:4:4.

* * * * *